United States Patent [19]

Boehringer

[11] 4,332,392
[45] Jun. 1, 1982

[54] DUAL SEALING RING SEAL WITH HYDRAULIC EXPANSION

[75] Inventor: Wilfred E. Boehringer, Fullerton, Calif.

[73] Assignee: McDonnell Douglas Corporation, Long Beach, Calif.

[21] Appl. No.: 266,799

[22] Filed: May 26, 1981

Related U.S. Application Data

[62] Division of Ser. No. 933,558, Aug. 14, 1978, Pat. No. 4,286,927.

[51] Int. Cl.³ .......................... F16J 9/08; F16J 15/38; F16J 15/48; F04B 1/16
[52] U.S. Cl. ........................................ 277/27; 277/59; 277/65; 277/86; 277/141; 277/142; 277/156; 277/216; 417/271
[58] Field of Search .................... 277/3, 27, 151, 141, 277/142, 154, 156, 216, 65, 86, 59; 417/271

[56] References Cited

U.S. PATENT DOCUMENTS

| | | | |
|---|---|---|---|
| 2,251,219 | 7/1941 | Brummer | 277/86 |
| 2,403,298 | 7/1946 | Payne | 277/86 |
| 2,408,909 | 10/1946 | Brummer | 277/86 |
| 3,119,623 | 1/1964 | Shevchenko | 277/27 X |
| 3,186,723 | 6/1965 | Wagner | 277/59 |
| 3,268,232 | 8/1966 | Richards | 277/59 X |
| 3,462,159 | 8/1969 | Baumann et al. | 277/27 |

FOREIGN PATENT DOCUMENTS 719879  4/1942  Fed. Rep. of Germany ........ 277/65

Primary Examiner—Robert S. Ward, Jr.
Attorney, Agent, or Firm—George W. Finch; John Scholl; Don Royer

[57] ABSTRACT

A seal for use in a cylindrical groove in a cylindrical item positioned in a cylinder such as a rotary valve where the seal is subjected to reciprocating forces as the item and the cylinder rotate with respect to each other. The seal has two adjacent pairs of outer sealing rings with each pair being backed up by a pair of backup rings which are positioned to bear outwardly on the sealing rings. A spring is positioned to push the pairs of sealing rings and the associated backup rings to the opposite sides of the groove to form the side seals and hydraulic pressure is provided underneath the rings to urge them outwardly to form the outward seal.

10 Claims, 10 Drawing Figures

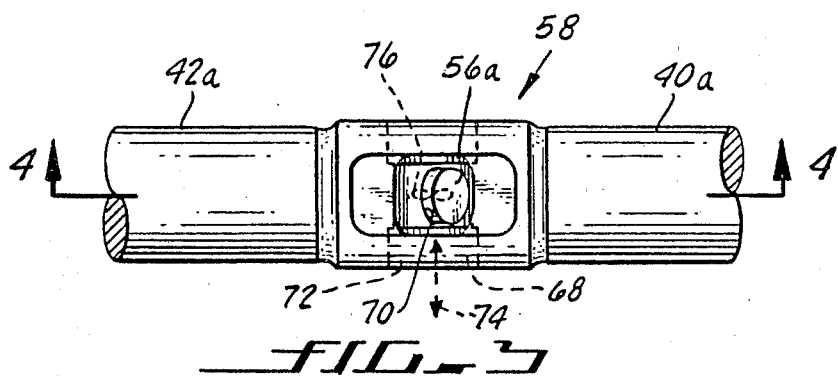
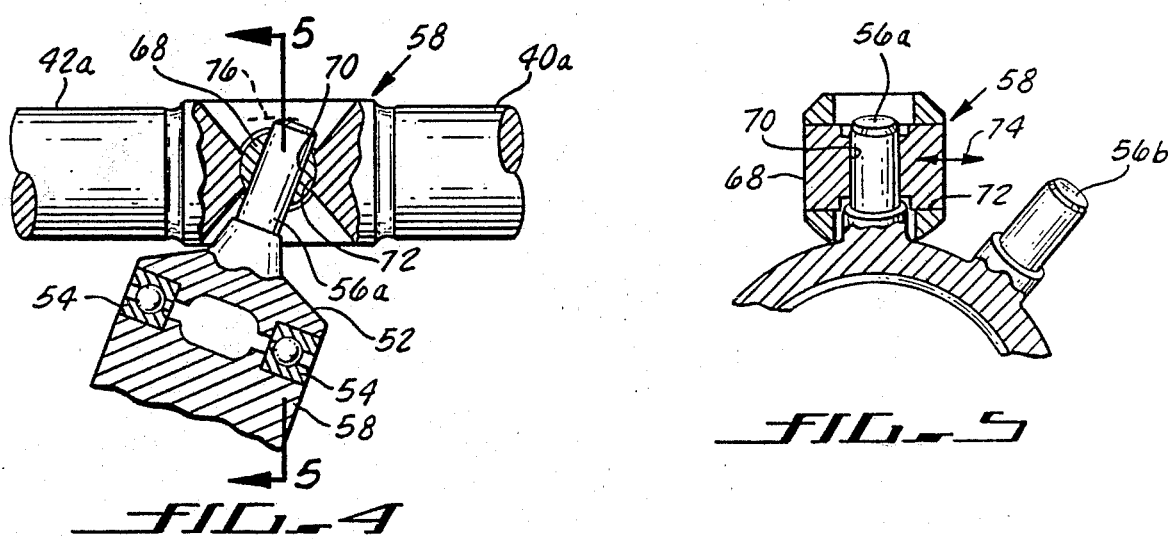

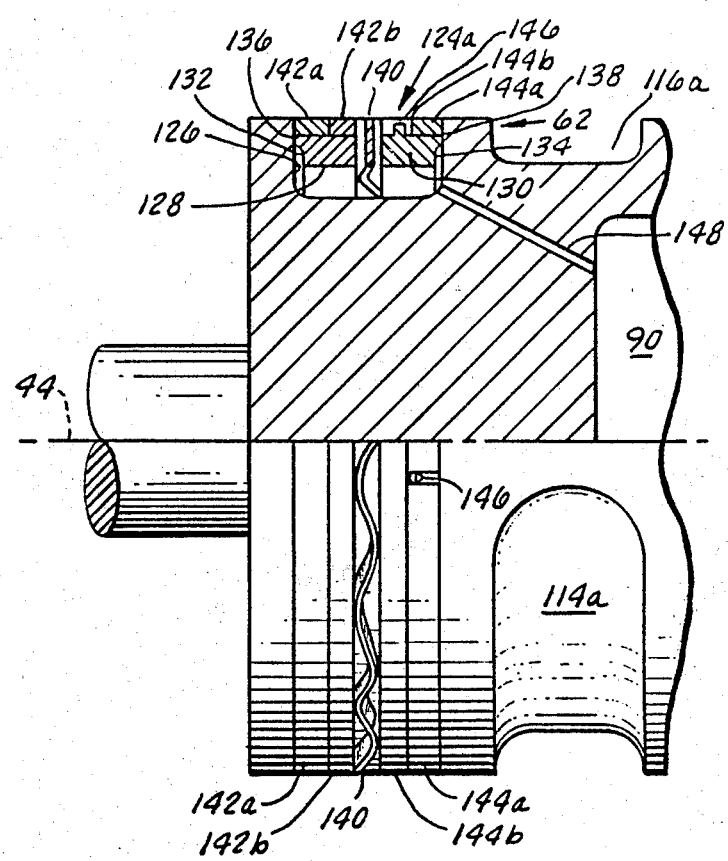
FIG_9

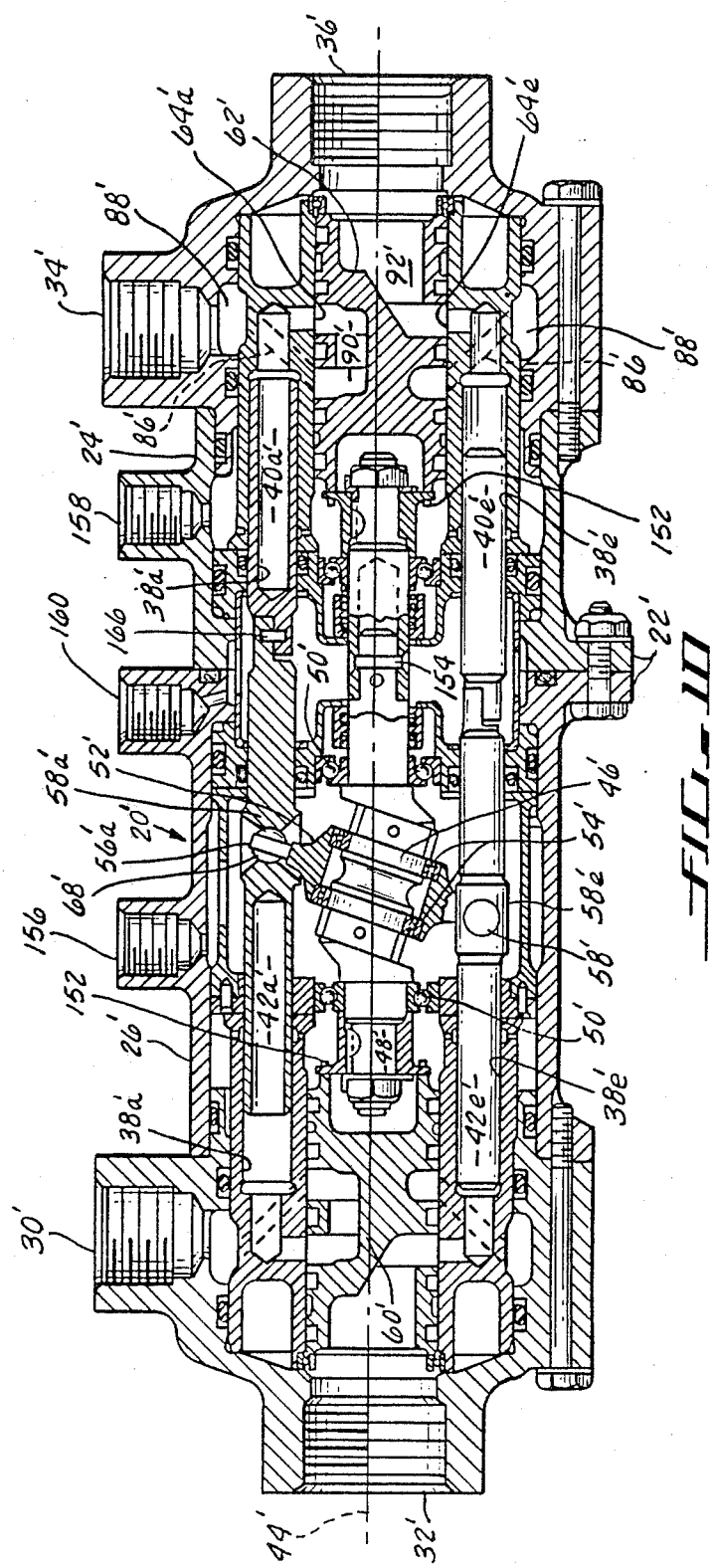

DUAL SEALING RING SEAL WITH HYDRAULIC EXPANSION

This is a division of application Ser. No. 933,558, filed Aug. 14, 1978, now U.S. Pat. No. 4,286,927.

BACKGROUND OF THE INVENTION

The invention belongs generally to a class of hydraulic power transfer units and particularly relates to such units having pistons mechanically arranged in a fixed phase relationship with each other to transfer energy from one hydraulic system to another without transferring fluid therebetween. Such hydraulic power transfer units find particular application in connection with modern aircraft where they are used to provide hydraulic system load sharing to maintain system redundancy particularly during takeoff and landing. In the past it has been conventional practice to install multiple and separate hydraulic systems to provide enough redundancy so that the failure of one or more components in a system does not cause catastrophic problems to the aircraft. Each separate system is usually powered from different prime movers, such as from different aircraft engines or auxiliary power units. It is particularly important during takeoff and landing that such redundancy be provided so that the failure of one hydraulic system does not disrupt some of the services required to be operated such as landing gear retraction which requires a large amount of hydraulic energy. To protect against this contingency, transfer motor pumps have been installed between hydraulic systems to permit the transfer of hydraulic energy from one system to another in either direction without the transfer of hydraulic fluid between the systems. This latter requirement that no fluid be transferred between systems assures that the operable system is protected from fluid loss and contamination.

A typical power transfer unit used heretofore in large aircraft consists of two conventional rotary pumps connected together, usually on a single shaft. Unfortunately, this type of motor pump is highly inefficient with very poor performance. Hence these motor pumps generate a substantial amount of heat which must be dissipated by additional equipment. Furthermore, this equipment is relatively noisy which, in some instances, is distressful to some of the passengers and, due to poor performance, cannot be placed passively between two hydraulic systems so that the equipment is immediately available for use. The noise and heat must be accommodated during landing and takeoff but at other times the heretofore conventional units are switched off. This is undesirable because additional complexity must be added to the circuitry to automatically transfer energy from one hydraulic system to another thereafter.

U.S. Pat. No. 3,890,064 entitled "Reciprocating Transfer Pump," of which the present applicant is a co-inventor, provides an improved power transfer device. However, this improved device requires relatively complex valving to effect power transfer in a given direction and to effect an automatic change of direction of the power transfer upon the loss of pressure in one system. In addition, the unit is heavy and considerable complexity is required to remove the significant pressure ripple generated during the valving cycle of the pump. This pressure ripple is undesirable in that it tends to over stress the surrounding hydraulic system. Hence, it is evident that there is still a further need for improved power transfer units to overcome these disadvantages.

There has also been a need for improvement in the coupling between the nutater and pistons in nutater-type pumps and motors. Previously, a certain amount of slop had to be tolerated between the spider and the piston. Such devices, where the relative positioning of the spider and pistons is not positive, are not practical in the present invention as they cannot endure the stressful environment of an aircraft hydraulic system while keeping the valving precise so that the efficiency of the power transfer remains high.

The start-up friction of a motor pump device usually is high due to pressure loads across the valving means thereof. This high start-up friction is undesirable since in aircraft applications, once the pressure in one system has dropped a relatively small amount, it is desirable that hydraulic energy be transferred thereinto and heretofore proposed valving schemes having flat plate valves have resulted in differential pressures in the range of 1200 to 1500 psi (8000 to 12000 kPa) between systems to start the transfer of energy or a very complex mechanism to balance the forces in the valve means.

BRIEF SUMMARY OF THE INVENTION

The basic building block of the present invention is a multi-piston reciprocating unit which may be utilized either as a motor to convert hydraulic pressure energy into the reciprocating motion of pistons or as a pump to convert the reciprocating motions of the pistons back into hydraulic energy. A pair of these units with their corresponding pistons, mechanically connected, when properly phased and connected to appropriate valving provide a reversible hydraulic power transfer unit, the unit connected to the hydraulic system with higher pressure acting as a motor and the other unit as a pump.

The motor or pump unit of the present invention is comprised of a plurality of pistons symmetrically arranged about and parallel to a central axis and slidable in a corresponding plurality of cylinders. The relative positions of the pistons are mechanically controlled by control means whose preferred form is a nutater mechanism or spider. The spider has a plurality of coplanar radial arms, each of which is coupled to a corresponding piston. The nutater forms an angle with a central shaft. Nutation thereof causes the central shaft to rotate and at the same time maintains the pistons in a predetermined phase relationship with each other.

Since the ends of the spider, which engage the pistons, each move in a complex pattern approximating a figure "8", suitable means must be provided to positively couple the spider ends to the pistons. This is accomplished, in the present invention, by providing cylindrical spider ends at the periphery of the spider which are aligned with the axis of nutation thereof. Each of such cylindrical spider ends are positioned to slide in a transverse bore in a cylindrical connector bushing which in turn is mounted for rotation and transverse movement in a cylinder connected to the piston. This arrangement allows the ends of the spider to move in their figure "8" pattern while restraining the pistons thereto at all times so that the force transmitting surfaces therebetween are always in contact and no impact loads are ever caused by the connection. Without this feature, it is unlikely that a practical device of the sort described could be constructed.

Although many valving arrangements, such as flat-plate valves may be used to provide suitable valving means for the present invention, the preferred construction utilizes a rotary valve, especially constructed, so that it can withstand the alternating loads applied thereacross. Such rotary valves are preferable to the flat-plate valves in that their start-up friction can be more easily controlled and they are scalable over a wide size range of motor pump applications.

Two basic reciprocating units are usually mechanically coupled back to back. In this case, the corresponding pistons of the two units are mechanically connected to be moved in unison, hence, only a single mechanical piston phase control means (spider) is required. When pressure applied to the pistons of one side is greater than the pressure applied to the pistons of the other side, the unit with the high pressure hydraulic fluid operates as a motor and the other a pump thereby transferring energy from one side to the other. When the combined unit is connected to two separate hydraulic systems, this accomplishes transfer of hydraulic energy from system to system without the transfer of fluid. The two units automatically reverse when the pressure differential therebetween reverses, and due to a predetermined operating friction thereacross, will not operate at all if a predetermined differential pressure is not applied thereacross. Therefore, the device can be left in a standby mode indefinitely and it will not operate until the predetermined differential pressure is applied thereacross, at which point, it will automatically transfer energy from the higher pressure system to the lower pressure system. The physical proportion in the unit which controls or sets this startup differential pressure, and which is very important to the unit's detail design, is the ratio of the piston area to the valve's startup friction torque. A large piston area relative to the valve friction will start at a lower differential pressure than one with a small piston area. However, for an optimum design at a given flow capacity, there is a practical piston size limitation, since the weight of the unit is also a factor, especially when designed for aircraft use; the mechanical phasing of the plurality of pistons provides for automatic damping of the piston discharge. Since the pistons are constrained by the nutater mechanism, their velocity assumes a sinusoidal function with a maximum velocity at mid stroke and a low velocity toward the end of the stroke. Also, since the nutater is used only to maintain the pistons and the valve means in proper phase relationship and not to connect energy between the systems which is accomplished by the back-to-back pistons, the heavy nutater and bearings normally employed in nutater type motors or pumps are not required.

It is, therefore, an object of the present invention to provide a unit for transferring hydraulic energy from one hydraulic system to another which operates automatically in response to a predetermined pressure differential present between the two systems.

Another object is to provide a hydraulic energy transfer unit which does not generate excess pressure ripple either in the giving or receiving system.

Another object is to provide means for reducing the complexity of redundant hydraulic systems on modern aircraft.

Another object is to provide hydraulic energy transfer means which are highly efficient and reliable in the rigourous environment of aircraft hydraulic systems.

Another object is to provide means for positively coupling the spider of a nutater device to pistons which are constrained to move in a linear direction.

Another object is to provide suitable valve means for rotary devices which have low start-up friction and long life.

Another object is to reduce the weight of hydraulic power transfer units to a minimum.

These objects and other advantages of the present invention will become apparent after considering the following detail specification which covers preferred embodiments thereof in conjunction with the accompanying drawings, wherein:

BRIEF DESCRIPTON OF THE DRAWINGS

FIG. 3 is an enlarged detailed top view of the connection between the spider and the pistons in the unit of FIG. 1;

FIG. 4 is a cross sectional view taken at line 4—4 in FIG. 3;

FIG. 5 is a cross sectional view taken at line 5—5 in FIG. 4;

FIG. 9 is a detail view still further enlarged of the seals used in the rotary valve configuration of FIGS. 6 and 7; and FIG. 10 is a cross sectional elevational view of a complete power transfer unit with its detail shown.

DETAILED DESCRIPTION OF THE PREFERRED EMBODIMENTS

Figure 1:
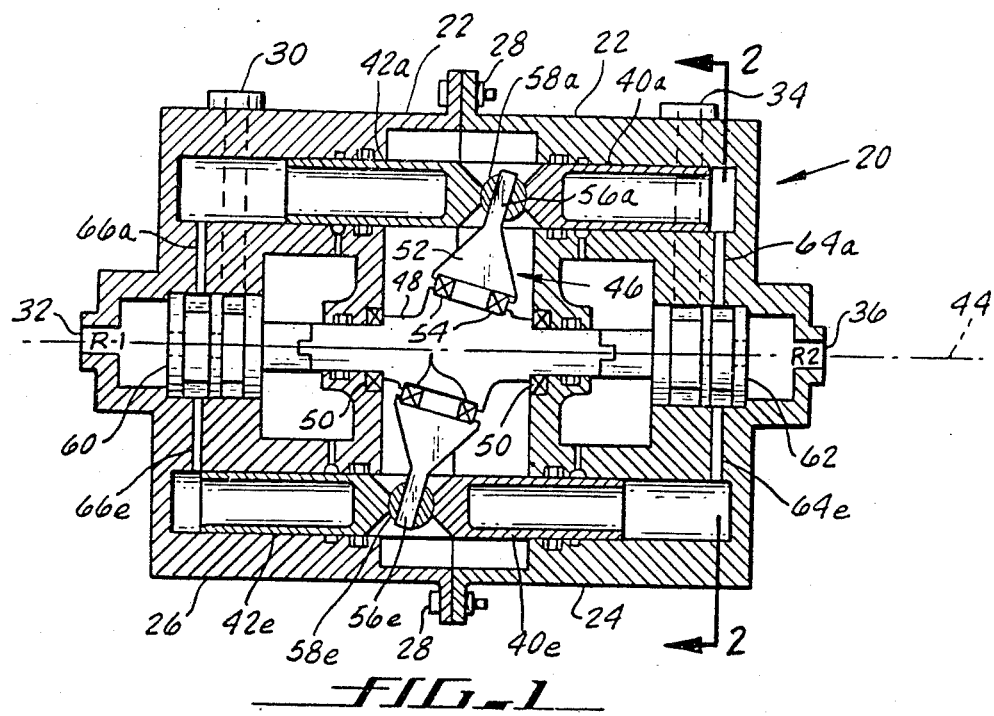
FIG. 1 is a simplified cross sectional view of a reciprocating motor pump unit constructed according to the present invention, the cross section being taken at line 1—1 in FIG. 2.

Referring to the drawings, more particularly by reference numbers, number 20, in FIG. 1 refers to a hydraulic power transfer unit constructed according to the present invention, the power transfer unit disclosed in FIG. 1 is shown in elemental form and is provided to explain the operation of such unit and not the mechanical details required to make such a unit practical, which details will be described hereinafter. The unit 20 is bi-directional, that is, it will transfer hydraulic energy in either direction between two hydraulic systems connected thereto. The unit transfers hydraulic energy from the system having a higher pressure to the system having a lower pressure by automatically sensing the differential pressure and reacting thereto.

The unit 20 includes a housing 22, which is shown in FIG. 1 as having a right hand half 24 and a left hand half 26, which are held together by suitable means such as the fasteners 28 shown. The housing half 26 includes at least one pressure port 30 and a return port 32 which usually are connected into a first hydraulic system while the housing half 24 has a pressure port 34 and a return port 36 which usually are connected to a second hydraulic system. Pressure port 30 receives hydraulic pressure from or supplies hydraulic pressure to system 1, while pressure port 34 provides the identical function to system 2. The return hydraulic fluid of system 1 which relatively is unpressurized enters or leaves the unit 20 through return port 32 while return port 36 provides the identical function for system 2.

Figure 2:
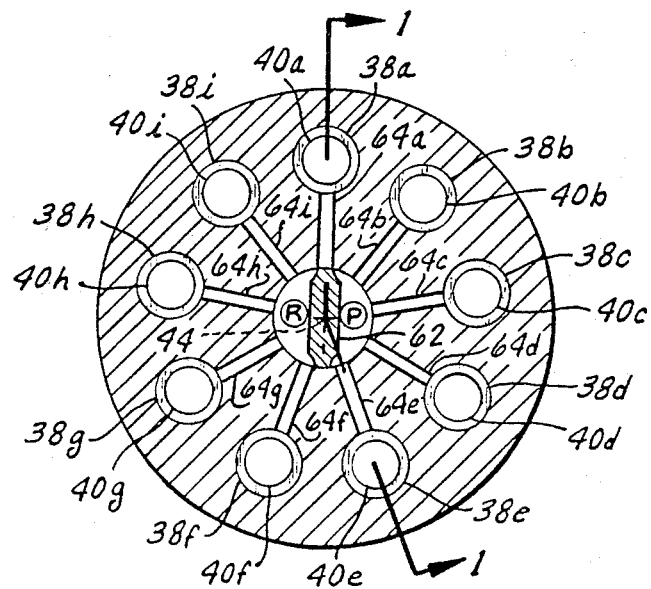
FIG. 2 is a cross sectional end view taken at line 2—2 in FIG. 1.
Figure 6:
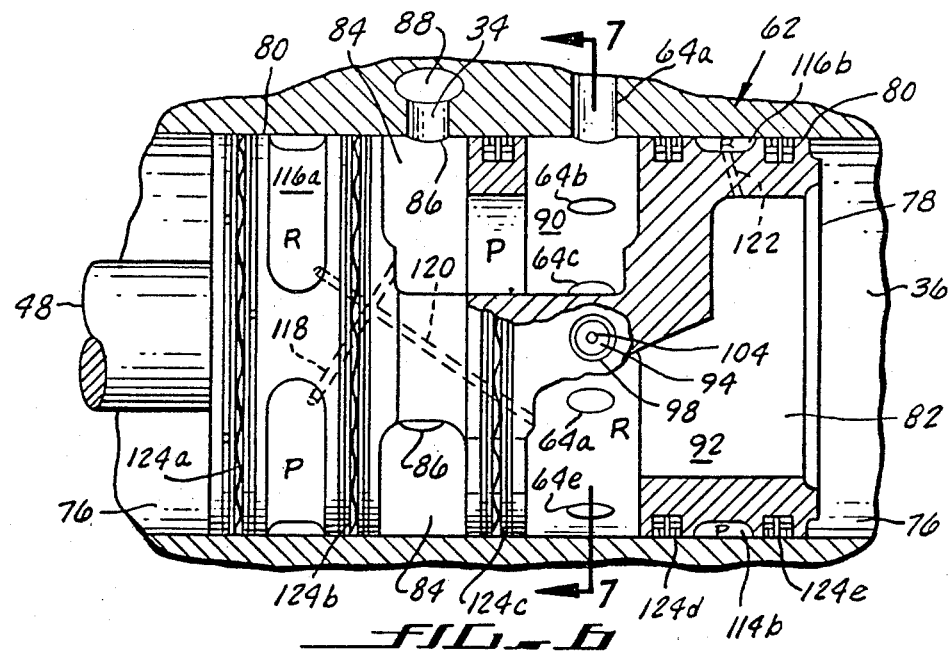
FIG. 6 is an enlarged detailed side view partially in cross section of the valving means as used in FIG. 1.

The housing 22 is provided with a plurality of cylindrical bores 38, a thru i, in each housing half 24 and 26 corresponding to an equal plurality of pairs of pistons 40a thru i and 42a thru i. The pistons 40 and 42 in each pair are arranged coaxially, one for each system, and the two pistons, 40 and 42 of each piston pair are interconnected to move together as shown in FIGS. 1 and 2. Nine piston pairs are provided which are disposed symmetrically and circumferentially about a central axis 44. The number of piston pairs provided is dependent upon the amount of pressure ripple that can be tolerated, and generally an odd number is desirable to reduce the harmonic content of any pressure fluctuation produced by the unit 20.

Each of the pairs of pistons 40 and 42 are mechanically interconnected to each of the other pairs by means of a nutator mechanism 46, which is provided to assure a predetermined phase relationship therebetween. The nutator mechanism 46 is mounted on a central shaft 48 journaled in a plurality of bearings 50. The central shaft 48 is rotated about its axis 44 by the nutator mechanism 46, which includes a spider 52, which is connected to the central shaft 48 at an acute angle with respect to the axis 44 by means of bearings 54. The spider 52 includes outwardly extending arms 56a thru i, of which 56a and 56e are shown in FIG. 1. The rods 56, by means of suitable interconnection means 58, connect to the associated pairs of pistons 40a thru i, and 42a thru i. Therefore the nutator mechanism 46 is constrained from rotation but nutates during operation, thereby to rotate the central shaft 48 as will be explained further.

The nutator spider 52 is actuated or nutated by the sequential repeating motion of the pairs of pistons 40a thru i, and 42a thru i, when the piston pairs are moved by differential pressure applied thereacross. This differential hydraulic pressure is applied when either system 1 or system 2 has a lower than normal pressure. The application of the pressure is through suitable valves which are shown as rotary valves 60 and 62, whose operation can be more clearly understood with reference to FIG. 2. Each rotary valve, 60 and 62 essentially shifts flow from the pressure port 30 or 34 to generally one half of the pistons 40 and 42, while connecting the return port 32 or 36 to the other pistons. Of course, as shown in FIG. 2 with regard to piston 40a, there must be locations which cease, at least momentarily, all flow into or out of the pistons as each piston reverses directions. When, for example, the pressure in system 1 is below that of system 2, this results in a differential pressure being applied across pistons 40b thru 40e when the unit 20 is in the position shown in FIGS. 1 and 2. As the pistons 40b thru 40e start to move to the left, the pistons 42b thru e also move to the left. The hydraulic fluid displaced by the movement of the pistons 42b thru e is conducted by means of the rotary valve 60 to the pressure port 30 through the passage ways 66b thru e, so that motion of the pistons 42b thru e tends to pressurize system 1. The movement of the pistons 40 and 42 also causes the spider 52 to nutate, which rotates the central shaft 48 to move the rotary valves 60 and 62 to a new valving position so that alternately each piston pair is valved to pressure and return, smoothly transferring hydraulic energy from one system to the other. Of course, when system 1 is the higher pressure system, the unit 20 transfers energy in the opposite direction since the pressure applied to the pistons by means of the valves 60 and 62 automatically will cause the nutator spider 52 to rotate in the opposite direction. It should be understood that many different types of valves such as flat plate valves may be substituted for the rotary valves diagramatically shown in FIGS. 1 and 2 without materially affecting the invention. However, it is important that the interconnection means 58 be such that positive positioning of the piston pairs with respect to the spider 52 is maintained at all times so that the phase relationship therebetween and between the rotary valves 60 and 62 is maintained. The construction of a preferred interconnection means is shown in detail in FIGS. 3, 4, and 5.

The interconnection means 58 includes a bushing 68 having a cylindrical bore 70 therethrough, which bore 70 permits pivotal and sliding motion of the rod 56 retained therein (rod 56a being shown). The bushing 68 is mounted in a bore 72 in the interconnection means 38 which is generally at a right angle to the bore 70 in the bushing 68. This permits lateral motion of the rod 56a with respect to the pistons 40a and 42a as shown by arrow 74. Interconnection means like means 58 shown are required since the end of the rod 56a moves in a figure 8 path 76 with respect to the pistons 40a and 42a as shown in FIG. 3 which figure 8 path 76 is cylindrical when viewed from the side as shown in FIG. 4. The interconnection means 58 shown provides both sliding and pivotal engagement between the nutator mechanism 46 and the pistons 40 and 42 assuring complete motion freedom at the interconnection, yet maintaining finite positioning between the elements.

The details of suitable rotary valve means are shown in FIGS. 6, 7, 8, and 9, which are enlarged views of rotary valve 62, which can be mirror image identical to rotary valve 60. The rotary valve 62 is retained within a cylindrical housing 76 coaxial with the central shaft 48. The valve 62 includes a body portion 78, having an outer cylindrical surface 80 sized to fit in the cylindrical housing 76 and to rotate there within. The body portion 78 also includes a return port connection 82 at the end thereof opposite from the central shaft 48 and a radial pressure port ring 84 positioned to communicate with the formerly mentioned pressure port 34. The radial pressure port ring 84 may communicate with a plurality of passageways 86 in the cylindrical housing 76 connected together by a manifold 88. The radial pressure port ring 84 is connected in communication to the main pressure chamber 90 of the valve 62, whereas the return connection passageway 82 is connected to the main return chamber 92 thereof.

Figures 7, 8:
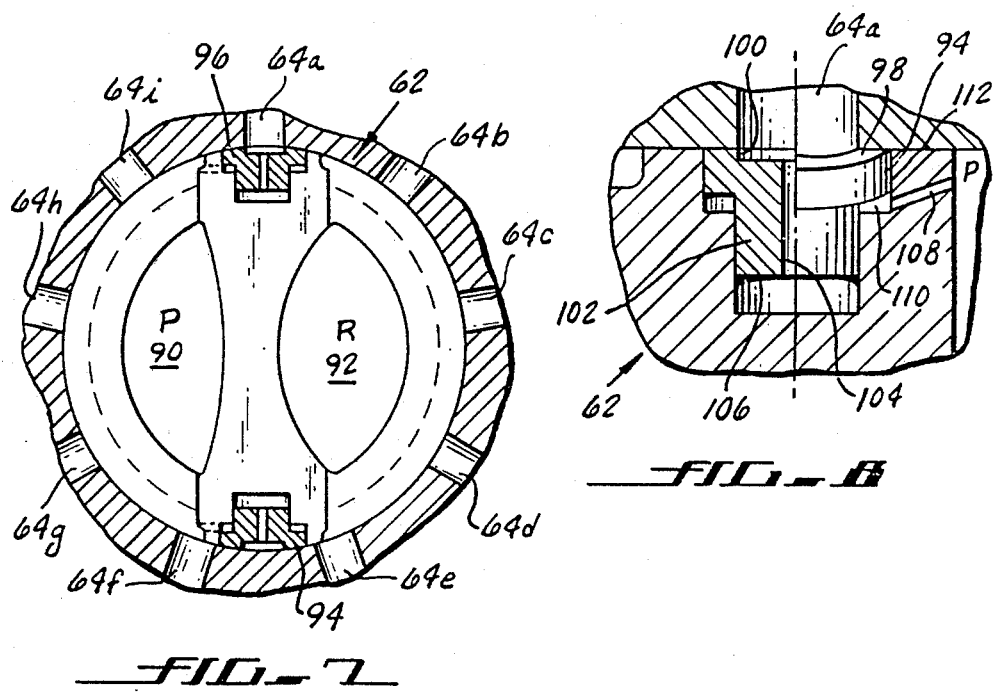
FIG. 7 is a cross sectional view taken at line 7—7 in FIG. 6 with the valve turned 90°.
FIG. 8 is a detail view still further enlarged of the balanced vane use in the rotary valve configuration of FIGS. 6 and 7.

As the valve 62 rotates, it alternately switches the passageways 64a thru i to communicate between the main pressure chamber 90 and the main return chamber 92. This switching action can be seen more clearly with reference to FIGS. 7 and 8 since FIGS. 1 and 2 show very simplified valves. The actual switching is made by a pair of pressure balanced vanes 94 and 96, which are essentially identical. An enlarged view of vane 94 is shown in FIG. 8. It includes an upper sliding surface 98, having generally a cylindrical shape adapted for sliding contact with the cylindrical housing 76. The surface 98 preferably is lapped to the cylindrical housing 76. The surface 98 is toroidal in shape when viewed from the housing 78 with its inner diameter 100, preferably the same diameter as the diameter of the ports 64 and defining an area approximately equal to the area of each of the ports 64. The vane 98 also has a central body portion 102, which preferably is cylindrical in shape and has the same diameter as the inner diameter 100 mentioned previously. Vanes of other shapes such as oblong or oval could be used depending on the space restraints in the unit 20 but cylindrical vanes 98 are more economical to manufacture. A passageway 104 is provided through the central body portion 102 so that hydraulic fluid pressure, whether it be that in the pressure side or the return side, is passed thereto to act upon an area 106 which is equal to the area within the inner surface 100 minus the area of the passageway 104. This causes the force which presses the surface 98 against the cylinder housing 76 to be independent of the pressure within the port 64. This last mentioned force is created by providing a pressure connection 108 to a toroidal area 110 underneath surface 98. Since the cylindrical side surface 112 adjacent thereto is at right angles to the area 110 and the area above and below the side surface 112 are preferably equal, the size of the toroidal area 110 determines the force at which the surface 98 is applied against the cylindrical housing 76, and can be adjusted during design, so that the desired force is achieved. This of course assumes that the unit 20 is working normally to keep the pressures in the two systems up to almost normal levels.

The vanes 94 and 96 allow a lapped fit across the port 64 as they are being switched from pressure to return or vice versa, yet, since the pressure at which they are forced against the wall can be designed as desired, very low startup friction and running friction is achieved without needless complexity.

The area of the main pressure chamber 90 and the main return chamber 92 which acts against the cylindrical housing 76 tends to load the body portion 78 of the valve 62 toward the ports 64, which at that moment, are acting as return ports. Therefore, pressure and return balancing areas 114a and b and 116a and b are provided with pressure areas 114a and b being located 180° from the ports 64 connected to pressure and the return balance areas 116a and b being 180° from the return connected ports 64. The areas 114a and 114b equal the area of the cylindrical housing 76 to which pressure is applied and the return balance areas 116a and b equal the area of the cylindrical housing 76 to which return is applied. Suitable passageways 118 and 120 connect the areas 114a, and 116a respectively to pressure and return, and similar passageways such as passageway 122 are used for areas 114b and 116b.

By balancing the thrust loads produced by the pressure chamber 90 and the return chamber 92, friction is greatly reduced between the valve body 78 and the cylindrical housing 76 to provide excellent start-up and running efficiency.

Radial ring assemblies 124a, b, c, d and e are used about the circumference of the valve body 78 with rings 124a, and 124e being positioned at the the ends thereof. Rings 124b and 124d are used to separate the balancing areas 114a and b, and 116a and b from the main chambers 90 and 92 and ring 124c is used to separate pressure from return. Since the ring assemblies 124 have loads applied thereacross which reverse about their circumference, special assemblies are required, which are shown in detail in FIG. 9. The ring assembly 124a, shown in FIG. 9 is representative of all the ring assemblies 124 and is shown positioned in a ring groove 126 coaxial with the axis 44 thereof. The ring assembly 124a includes a pair of inner backup rings 128 and 130, whose radially opposite surfaces 132 and 134 include sidwardly extending projections 136 and 138. It is desirable to reduce the end area of the projections 136 and 138 to a minimum so that the friction generated between the projections 136 and 138, and the groove 126 is minimized. The rings 128 and 130 are energized against the side walls 139a and 139b of the groove 126 by a wave spring 140 positioned therebetween.

Each of the backup rings 128 and 130 has a pair of rings 142a and b, and 144a and b as shown. The rings are pinned by projections 146, which extend from adjacent rings into the gaps 147 therein. This assures that the gaps 147 in the rings never align themselves to cause a leak.

When used as shown, the rings 128, 130, 142a and b, and 144a and b are stationary within the cylindrical housing 76. Relative motion occurs at the sides of the rings, and the ring area wherein the relative motion occurs is reduced by providing the projections 136 and 138 to minimize friction between the rings and the rotary valve body portion 78 as aforesaid. The rings 128, 130, 142a and b, and 144a and b are energized outwardly by providing a connection 148 between the groove 126 and the main pressure chamber 90 so that pressurized fluid tends to expand the rings outwardly against the cylindrical housing 76 to assure that they remain stationary thereon.

An actual production type design of the present invention is shown in FIG. 10 wherein the portions thereof previously discussed have been given the same numbers with a prime (') added thereto. The additional features shown include those required so that mechanical breakage of the unit 20' at any one location will not cause the loss of more than one hydraulic system. This is accomplished in part by providing keyed connections 152 between the central shaft 48' and the rotary valves 60' and 62' and providing a shear pin connection 154 along the shaft 48'. Also shown is a case drain port 156 for system 1, a case drain port 158 for system 2 and a vent port 160 therebetween to drain off leakage fluid. Port 160 is the passageway through which hydraulic fluid may escape in the case of failure of one of the two systems within the unit 20'. The flow of fluid out of port 160 indicates failure of at least one system. It should also be noted that the pistons 42' are connected to the pistons 40' by slip joints 166 which allow a slight amount of misalignment between the pistons 40' and 42'.

Thus there has been shown and described a novel automatic bi-directional hydraulic power transfer unit that causes the system with the higher input pressure to transfer hydraulic energy to the other. When the pressure of the two systems are essentially equal, that is, there is not enough pressure differential to overcome a predetermined amount of friction within the unit, the pistons will not move nor will the nutator mechanism be able nutate, and the whole unit stands still. Thus the unit fulfills all the objects and advantages sought therefor. Many changes, modifications, variations and other uses and applications of the subject invention however will become apparent to those skilled in the art after considering this specification and the accompanying drawings. All such changes modifications, alterations and other uses and applications which do not depart from the spirit and scope of the invention are deemed to be covered by the invention which is limited only by the claims which follow.

What is claimed is:

1. A seal for use in a cylindrical groove in a cylindrical item positioned in a cylinder wherein said seal is subjected to reciprocating forces as the item and the cylinder rotate with respect to each other, the seal including:
- two adjacent pairs of sealing rings having outer cylindrical surface portions whose outer cylindrical surface portions form the outer cylindrical surface of said seal, each pair having a side surface positioned to engage an adjacent side wall of the groove;
- a pair of backup rings which are positioned to bear outwardly on said two adjacent pairs of sealing rings, each having a side surface positioned to engage the groove side wall; and
- bias means positioned to force said side wall engaging surfaces of said sealing rings and said backup rings into engagement with the side walls.

2. The seal defined in claim 1 wherein said groove side wall engaging surfaces of said backup rings include cutouts therein to reduce the friction thereof with the side walls.

3. The seal defined in claim 1 wherein said bias means include a ring shaped, serpentine spring member positioned between said two adjacent pairs of sealing rings and between said backup rings to bias said rings sidewardly.

4. The seal defined in claim 1 wherein said backup rings each have a predetermined radial thickness and wherein said groove side wall engaging surface of each of said backup rings includes a ring shaped radial surface which has a radial thickness which is less than said predetermined radial thickness of said backup ring.

5. The seal defined in claim 4 wherein said groove side wall engaging surface of each of said backup rings is positioned adjacent said adjacent pair of sealing rings.

6. The seal defined in claim 5 wherein said bias means include a ring shaped, serpentine spring member positioned between said two adjacent pairs of sealing rings and between said backup rings to bias said rings sidewardly.

7. The seal defined in claim 6 wherein said sealing rings and said backup rings are discontinuous rings, said sealing rings and said backup rings including means to positively locate the relative position of said discontinuities thereof.

8. The seal defined in claim 6 wherein each of said sealing rings has a joint therethrough, each of said backup rings including outwardly extending tangs positioned in said joints to positively locate said joints of said adjacent sealing rings with respect to said backup ring.

9. The seal defined in claim 1 wherein said sealing rings and said backup rings are discontinuous rings, said sealing rings and said backup rings including means to positively locate the relative position of said discontinuities thereof.

10. The seal defined in claim 3 wherein said bias means also include means for applying hydraulic pressure to said backup rings and to at least one of said sealing rings of each pair thereof, whereby the hydraulic pressure urges said sealing rings radially outwardly as well as sidewardly.

* * * * *